(12) United States Patent
Wilmink et al.

(10) Patent No.: US 8,783,216 B2
(45) Date of Patent: Jul. 22, 2014

(54) OIL/COOLANT MODULE WITH COOLANT TREATMENT SYSTEM

(75) Inventors: Joerg Wilmink, Schuettorf (DE); Reiko Haase, Ebersbach (DE)

(73) Assignee: Hengst GmbH & Co. KG, Muenster (DE)

( * ) Notice: Subject to any disclaimer, the term of this patent is extended or adjusted under 35 U.S.C. 154(b) by 1129 days.

(21) Appl. No.: 11/571,973

(22) PCT Filed: Jul. 12, 2005

(86) PCT No.: PCT/DE2005/001232
§ 371 (c)(1),
(2), (4) Date: Jan. 11, 2007

(87) PCT Pub. No.: WO2006/005329
PCT Pub. Date: Jan. 19, 2006

(65) Prior Publication Data
US 2008/0006229 A1    Jan. 10, 2008

(30) Foreign Application Priority Data

Jul. 14, 2004  (DE) .................... 20 2004 011 115 U
Nov. 23, 2004  (DE) .................... 20 2004 018 136 U

(51) Int. Cl.
*F01P 11/08*  (2006.01)

(52) U.S. Cl.
USPC .......................................... 123/41.33; 236/34

(58) Field of Classification Search
USPC ................. 123/41.44, 41.47, 41.33, 196 AB; 236/34.5; 184/104.1, 104.2, 104.3
See application file for complete search history.

(56) References Cited

U.S. PATENT DOCUMENTS

| 3,321,083 | A | * | 5/1967 | Thornton | 210/198.1 |
| 3,353,590 | A | * | 11/1967 | Holman | 165/297 |
| 4,324,213 | A | * | 4/1982 | Kasting et al. | 123/196 A |
| 4,370,957 | A | * | 2/1983 | Skatsche et al. | 123/196 AB |
| 4,426,965 | A | * | 1/1984 | Patel | 123/196 AB |
| 4,878,536 | A | * | 11/1989 | Stenlund | 165/119 |
| 5,024,268 | A | * | 6/1991 | Cheadle et al. | 165/134.1 |
| 5,435,346 | A | * | 7/1995 | Tregidgo et al. | 137/564.5 |
| 5,477,817 | A | * | 12/1995 | Hufendiek et al. | 123/41.33 |
| 5,647,306 | A | * | 7/1997 | Pateman | 123/41.33 |
| 5,753,116 | A | * | 5/1998 | Baumann et al. | 210/206 |
| 5,988,265 | A | | 11/1999 | Marthaler | |
| 6,182,616 | B1 | * | 2/2001 | Itoh et al. | 123/41.1 |
| 6,235,194 | B1 | * | 5/2001 | Jousset | 210/206 |
| 6,634,323 | B2 | * | 10/2003 | Vaudry et al. | 123/41.1 |
| 6,884,348 | B2 | | 4/2005 | Baumann | |

(Continued)

FOREIGN PATENT DOCUMENTS

| DE | 1020831 | 12/1957 |
| DE | 30408449 | 10/1981 |

(Continued)

OTHER PUBLICATIONS

English language Abstract of DE 19907267.

(Continued)

*Primary Examiner* — Hung Q Nguyen
(74) *Attorney, Agent, or Firm* — Greenblum & Bernstein, P.L.C.

(57) ABSTRACT

An oil/coolant module for a combustion engine, includes an oil filter, an oil/water heat exchanger, a water pump, and a coolant treatment system comprising a water filter and containing treatment additives for a coolant circuit.

2 Claims, 8 Drawing Sheets

(56) References Cited

U.S. PATENT DOCUMENTS

| | | | |
|---|---|---|---|
| 2002/0023614 A1 | 2/2002 | Hartmann et al. | |
| 2002/0121554 A1* | 9/2002 | Vaudry et al. | 236/34 |
| 2003/0029394 A1 | 2/2003 | Miyagawa et al. | |

FOREIGN PATENT DOCUMENTS

| | | |
|---|---|---|
| DE | 4211896 | 10/1993 |
| DE | 4400952 | 5/1995 |
| DE | 19719199 | 3/1998 |
| DE | 19907267 | 8/2000 |
| DE | 20018278 | 4/2002 |
| EP | 0838577 | 4/1998 |
| EP | 0898060 | 8/1998 |
| EP | 1063397 | 12/2000 |
| EP | 1211390 | 6/2002 |
| EP | 1211391 | 6/2002 |
| EP | 0926322 | 11/2003 |

OTHER PUBLICATIONS

English language Abstract of DE 19719199.
English language Abstract of DE 4211896.
English language Abstract of DE 1020831.

* cited by examiner

OIL/COOLANT MODULE WITH COOLANT TREATMENT SYSTEM

CROSS-REFERENCE TO RELATED APPLICATIONS

The present application is a U.S. National Stage of International Patent Application No. PCT/DE2005/001232 filed Jul. 12, 2005 which published as WO 2006/005329 on Jan. 19, 2006, and claims priority of German Patent Application Nos. 20 2004 011 115.2 filed Jul. 14, 2004 and 20 2004 018 136.3 filed Nov. 23, 2004.

BACKGROUND OF THE INVENTION

1. Field of the Invention

The invention relates to an oil/coolant module and a filter insert suitable therefor. Within the scope of the present invention the coolant of the combustion engine is also referred to in brief and for simplification as "cooling water" or "water."

2. Discussion of Background Information

An oil/coolant module of this type is known from practice.

An oil/coolant module for a combustion engine is known from EP 898 060 B1, having an oil filter and an oil/water heat exchanger.

These two known oil/coolant modules respectively represent a type of treatment unit for the oil of the combustion engine, since, on the one hand, the oil filter ensures the quality of the oil and, on the other hand, the heat exchanger produces its optimal operating temperature: since the cooling water heats up more quickly than the oil, the oil is heated by the oil/water heat exchanger after the engine startup so that it reaches its optimal operating temperature as quickly as possible. Since the cooling water is subsequently cooled by the cooler provided in the coolant circuit to a temperature that is lower than the maximum permissible oil temperature, the oil can be cooled by the heat exchanger during the further operation of the engine so that the oil can be kept reliably within its provided temperature range.

SUMMARY OF THE INVENTION

The invention aims to improve a generic oil/coolant module such that it makes it possible through a high integration density:

To keep the space requirements necessary for the combustion engine and, in particular, its peripheral components as small as possible;

To increase the operational reliability of the engine by keeping the number of connecting joints to be sealed between separate components as low as possible;

To make it possible for the design engineer of the combustion engine or of a vehicle holding the combustion engine to have the greatest possible freedom of design; and To simplify the accessibility for service personnel to the components of the combustion engine to be serviced.

Furthermore, the invention provides for a filter insert that is particularly suitable for use in an oil/coolant module of this type.

In other words, the invention proposes integrating a coolant treatment system in the oil/coolant module. The oil/coolant module thus becomes a central treatment unit for the liquids relevant to the engine, namely for the cooling water and for the oil, which can be treated and serviced at a central location. The additional incorporation of the coolant treatment system into the oil/coolant module yields the following advantages:

Fluid passages for the water can be made smaller in size. This alone reduces the space required, since no external lines need to be laid.

Because the fluid passages are integrated into the oil/coolant module, not only are flow losses due to flow resistances reduced, but through the integration into a single housing, the points of potential leakage are also reduced.

Accessibility for servicing to the corresponding components can be improved, since access to the service components of the oil as well as to those of the coolant is now possible at a single easily accessible point.

The structural freedom for the design, e.g., of a vehicle engine compartment, is improved, since accessibility to the service components of the engine fluid needs to be taken into consideration only at this one above-mentioned point, while installation space available at other points can now be better used.

The coolant treatment system provided according to this proposal has a water filter and treatment additives called inhibitors, which can be used, e.g., as corrosion inhibitors and antifreeze agents in the cooling water. They can be present, e.g., as solid tablets, that dissolve in the coolant and release the soluble inhibitors, or they can be present in a closed, liquid-tight cartridge.

A covering is possibly provided that, e.g., protects a solid tablet from air humidity or that is provided anyway in the form of the above-mentioned cartridge in the case of liquid treatment additives, can be opened manually before the treatment additives are inserted into the coolant circuit.

However, it can be particularly advantageously provided that this covering is automatically opened when it is inserted into the oil/coolant module, so that the treatment additives automatically pass into the coolant circuit. It is thus ensured that the treatment additives provided in the covering pass into the coolant circuit. Moreover, in this manner the treatment additives can be reliably prevented from coming into to contact with the skin of the user. For automatic opening, for example, a disturbing contour can be provided in the oil/coolant module which damages the covering and thus opens it when the covering is inserted into the oil/coolant module.

It can advantageously be provided to handle the treatment additives together with a filter element of the water filter. Savings can thus be achieved in terms of space and the number of components necessary, compared to a separate opening otherwise necessary with its own cover lid for inserting the treatment additives into the oil/coolant module. In addition, it can be ensured that the treatment additives are added to the coolant system regularly when the filter element is inserted into the water filter. The treatment additives first reach the cooling water system for first time together with the filter element upon the installation of the coolant treatment system and continue to refresh it at each filter replacement by the use of a new filter element equipped with inhibitors.

If the filter insert is embodied, for example, as a hollow cylinder, the treatment additives can be arranged in the hollow interior of the filter insert.

A bypass oil filter can preferably be provided which can be advantageously embodied as a centrifugal separator in a manner known per se. The bypass oil filter renders possible a particularly reliable oil filtration.

The bypass oil filter can preferably be arranged in the same housing together with the full flow oil filter. A space-saving arrangement of the two oil filter devices is thus rendered possible, and the arrangement of the individual oil passages is simplified with the structural design of the housing of the oil/coolant module.

Advantageously, a cooling-water thermostat can be provided and integrated into the oil/coolant module, so that a large or a small cooling water circuit is activated by this thermostat in a manner known per se. The integration of the thermostat into the oil/coolant module reduces the number of piping systems otherwise possibly necessary. In particular, through the arrangement of the thermostat on the intake side, the space available in the oil/coolant module can be used in an optimum manner, and unused empty space in the oil/coolant module otherwise possibly provided can thus be avoided.

Advantageously, a connection for a device for tempering fuel, i.e., for preheating fuel or for cooling fuel, can be provided so that either the cooling water of the combustion engine heating up can preheat the fuel at low outside temperatures and, e.g., liquefy paraffin-coated diesel fuel components or, with high engine performance and high outside temperatures, the fuel located in the engine compartment can be cooled and the formation of steam bubbles in the fuel can be prevented.

Advantageously, a connection to the cabin heater can be provided on the oil/coolant module so that when the combustion engine is used in a motor vehicle warm water can be removed for the vehicle interior heater.

Advantageously, a connection for cooling an air compressor, as is provided, e.g., for the brake system of a truck, can be provided on the oil/coolant module. Finally, the integration density of the oil/coolant module can be particularly high because a connection to the coolant recovery tank is provided.

Through the latter connections, most of the otherwise customary tapping points provided, e.g., in hose lines become unnecessary and thus the danger of leakage points is reduced, so that overall a particularly operationally reliable coolant system is created and environmentally harmful emissions caused by leakage in all probability will be avoided since the number of hoses and consequently hose connection points can be reduced.

Advantageously, a connection for a device for cooling an electric generator of the combustion engine can be provided so that the arrangement of a generator of this type is made possible even under thermally unfavorable conditions, and consequently the optimum installation of a generator for the optimum use of space is made possible even if installation space in a vehicle is tight.

Advantageously, the thermostat provided in the oil/coolant module can be embodied as an annular slide valve, e.g., in contrast to otherwise known poppet valves. The embodiment as annular slide valve makes possible a particularly favorable and space-saving guidance of the flow passages so that the structural dimensions of the oil/coolant module can be kept small.

Preferably filling openings are provided both for oil and for the coolant so that the oil/coolant module can be embodied as a service point in the engine compartment and can be provided at an easily accessible place where, on the one hand, cooling water can be refilled and, on the other hand, the oil level can be checked and, if necessary, oil can be refilled.

Advantageously, the guidance of the oil and the water can occur diagonally in the countercurrent in the heat exchanger of the oil/coolant module. As a result, optimally long paths for the fluids and consequently optimally long dwell times in the heat exchanger are realized so that a particularly intensive heat transfer can take place.

Advantageously, on the oil/coolant module a connection can be provided which leads to the crankcase of the combustion engine, whereby several return pipes, which otherwise have separate passages inside the oil/coolant module, are brought together in this single connection, i.e., in a single opening. A return line can thereby lead from a bypass oil filter to this connection, for example, likewise a drainage line from the main oil filter, which drainage line allows the residual oil to flow off from the filter housing, e.g., during a filter insert replacement, and likewise a filler passage can lead from the above-mentioned oil filling opening to this connection. Because these several lines or passages lead to a single connection opening, the number of places to be sealed is lower, producing an improved operational reliability of the oil/coolant module or of the combustion engine provided with the oil/coolant module.

Advantageously, several lines can also be brought together to a single connection, thus a single outlet opening or a single inlet opening, on the coolant side. On the pressure side these can be, e.g., connections that are provided for cooling an exhaust gas recirculation system or for tempering the fuel, whereby further units can also be provided in addition to these two above-mentioned devices, which devices can be cooled by way of the cooling water.

On the suction side of the water pump, the connections, e.g., for devices for cooling an air compressor or for cooling a generator, can be combined into a single inlet opening. The suction side of the water pump can preferably be integrated exclusively into the oil/coolant module so that the suction pressure of the water pump exists exclusively in the oil/coolant module and all the functions of the combustion engine which require a back flow to the suction side of the water pump are connected to a passage in the oil/coolant module or are combined into a single passage. These can be, e.g., water-bearing passages of the heater, the filling line for a recovery tank, the air compressor and the like.

Advantageously, the pressure side and the suction side of the water pump can be separated by only one wall, so that a very simple integration of a water filter into the oil/coolant module is rendered possible.

The invention also provides for an oil/coolant module for a combustion engine, comprising an oil filter, an oil/water heat exchanger, a water pump, and a coolant treatment system comprising a water filter and containing treatment additives for a coolant circuit.

The treatment additives may be embodied as a solid tablet that contains inhibitors soluble in coolant. The treatment additives may be adapted to be arranged in a closed, liquid-tight cartridge. The treatment additives may be arranged in a closed, liquid-tight cover. The cover may be capable of being automatically opened. The treatment additives may be connected to a filter insert of a water filter, whereby the treatment additives automatically pass into the coolant circuit upon insertion of the filter insert.

The module may further comprise one of: a bypass oil filter; a bypass oil filter arranged in a same housing as the oil filter; and a bypass oil filter embodied as a centrifugal separator.

The module may further comprise suction and pressure sides arranged on the water pump; at least one of a suction-side and a pressure-side connection in the oil/coolant module; and a thermostat arranged on the suction side of the water pump, whereby the thermostat, depending on a coolant temperature, one of: activates a short-circuit coolant circuit to the water pump, avoiding a coolant cooler; and activates a larger coolant circuit guided through the coolant cooler to the water pump.

The module may further comprise at least one of: a connection for a device for fuel preheating; a connection for a device for heating a passenger cabin; a connection for a device for cooling an air compressor; a connection to a coolant recovery tank; a connection to a temperature sensor; a connection for initial filling of the oil/coolant module; a connection for initial filling of the combustion engine; a connection for a device for cooling an exhaust gas recirculation system; a connection for a device for tempering fuel; a connection for attachment of an oil filler nozzle; and a connection for a device for cooling a generator.

The module may further comprise a thermostat embodied as an annular slide valve. The module may further comprise filling openings provided for oil and coolant. Two fluids may be guided diagonally in said heat exchanger.

The module may further comprise a connection that goes to a crankcase of the combustion engine, whereby inside the oil/coolant module several passages lead to said connection and serve as a drainage line from the oil filter and as filler passage from an oil filling opening.

The module may further comprise connections provided on a coolant pressure side of the oil/coolant module. The connections may comprise a connection for a device for cooling an exhaust gas recirculation system and a connection for a device for tempering the fuel. The connections may form a single passage that has a single outlet opening on the oil/coolant module.

The module may further comprise connections provided on a coolant suction side of the oil/coolant module. The connections may comprise one of: a connection for a device for cooling an air compressor; and a connection for a device for cooling a generator. The connections may form a single passage that has a single inlet opening on the oil/coolant module.

The module may further comprise a pressure side and a suction side of the water pump, wherein passages for the pressure side and the suction side of the water pump are separated by only one wall. The module may further comprise a filter insert for a water filter of the oil/coolant module. The treatment additives may be connected to the filter insert such that the treatment additives automatically pass into the coolant circuit upon insertion of the filter insert into the oil/coolant module.

The invention also provides for an oil/coolant module for a combustion engine, comprising a housing adapted to be connected to an engine block, an oil/water heat exchanger arranged in the housing, an oil filter arranged on the housing, a water pump housing, and a coolant treatment system comprising a water filter, wherein oil passes from said heat exchanger to the oil filter, and wherein one portion of coolant passes to the coolant treatment system and another portion flows out of an outlet to cool the combustion engine.

The one portion of the coolant may pass to the coolant treatment system after passing said heat exchanger.

The invention also provides for an oil/coolant module for a combustion engine, comprising a housing adapted to be connected to an engine block, an oil/water heat exchanger arranged in the housing, an oil filter arranged on the housing, a water pump housing having an outlet in fluid communication with a space containing said heat exchanger, and a coolant treatment system comprising a water filter, wherein oil passes from said heat exchanger to the oil filter.

One portion of coolant may pass to the coolant treatment system and another portion flows out of an outlet to cool the combustion engine and said one portion of the coolant passes to the coolant treatment system after passing said heat exchanger.

BRIEF DESCRIPTION OF THE DRAWINGS

An exemplary embodiment of the invention is explained in more detail below on the basis of the purely diagrammatic drawings wherein.

DETAILED DESCRIPTION OF THE INVENTION

Figure 1:
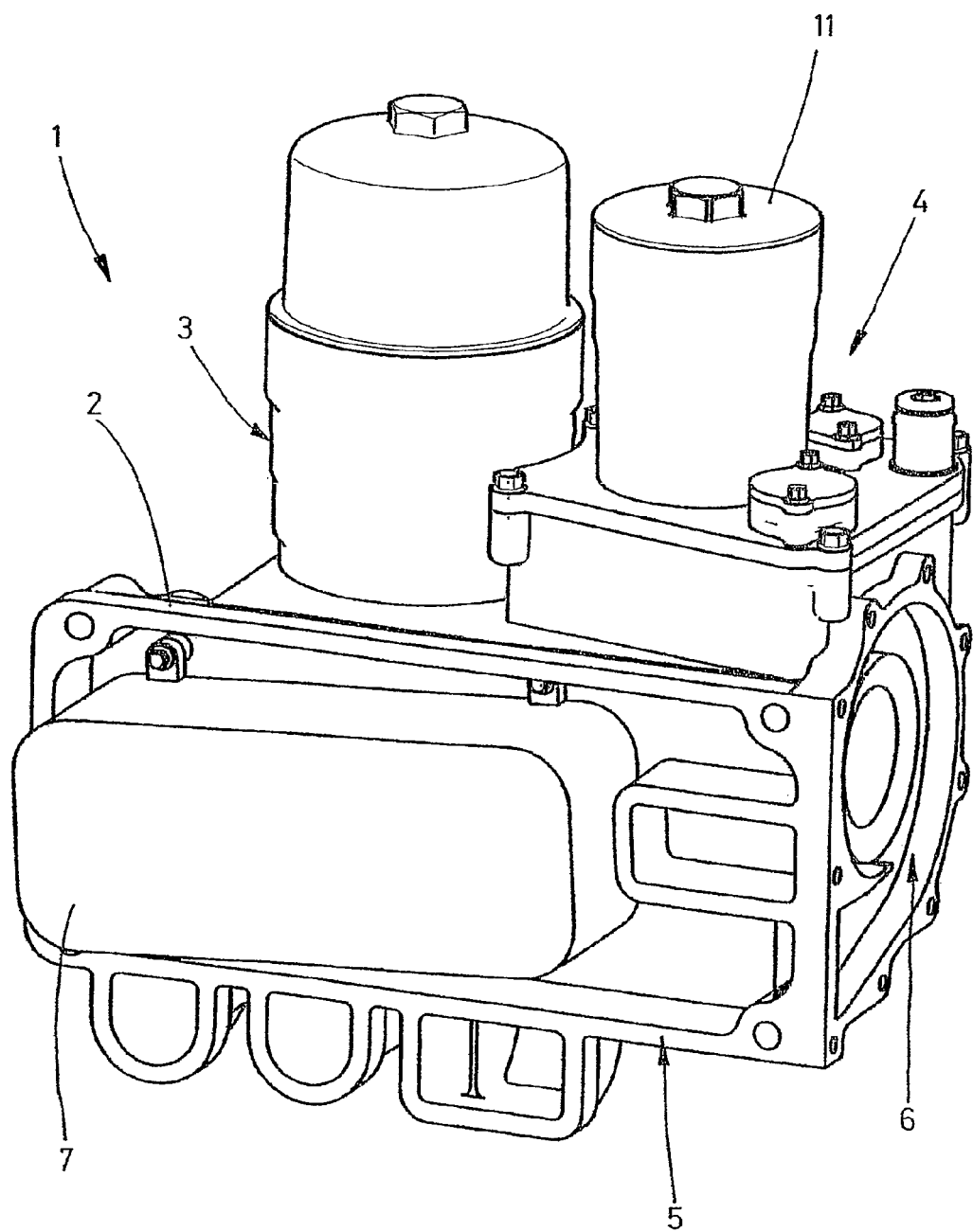
FIGS. 1-6 show various, in part perspective views of the oil/coolant module.
Figure 2:
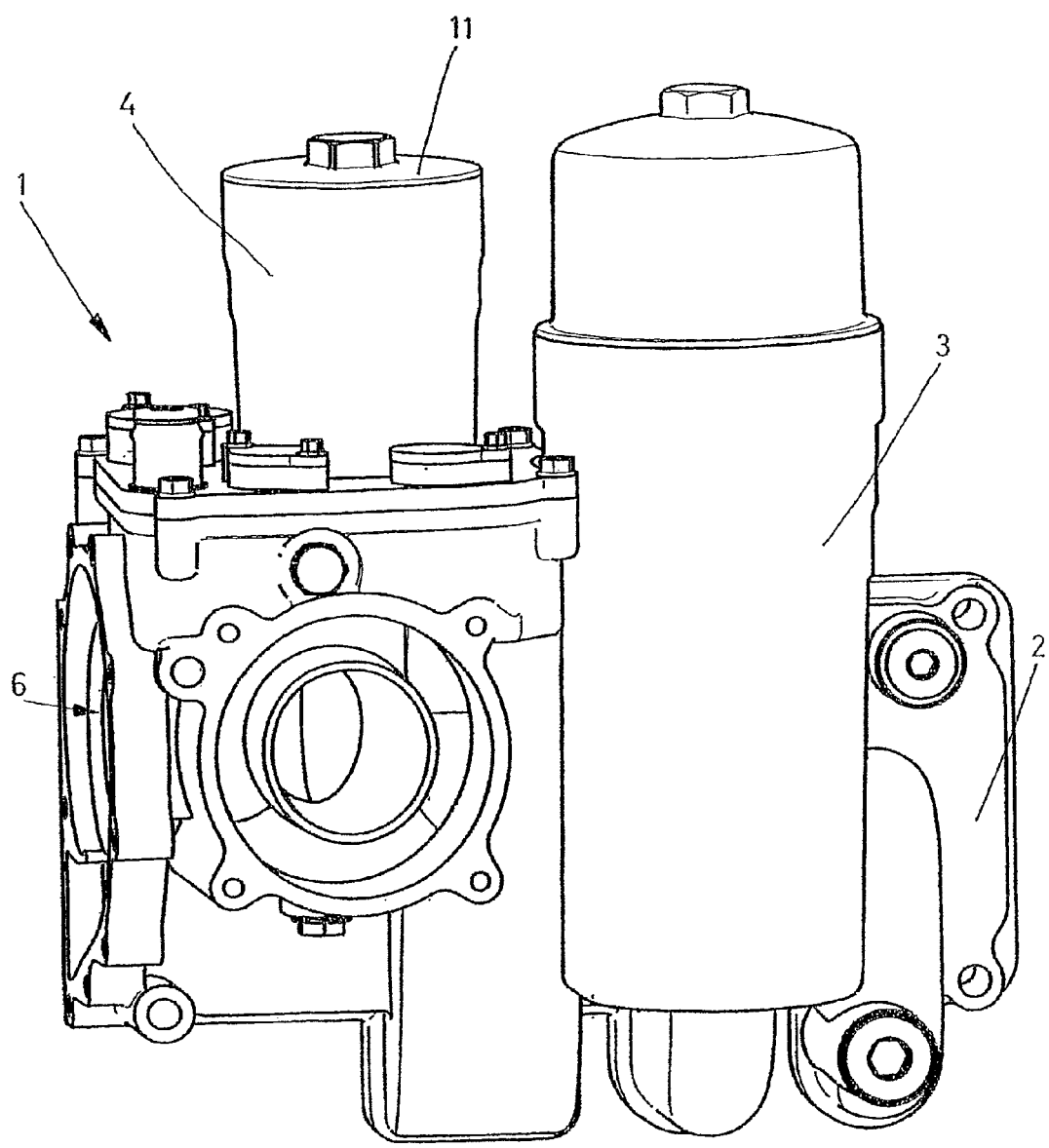

In the drawings, a so-called oil/coolant module 1 is shown that has a central housing 2, whereby this housing 2 also forms a cup-shaped housing of an oil filter 3 and of a coolant treatment system 4. The housing 2 has a lateral connecting surface 5 with which it can be connected to the engine block of a combustion engine.

At the front face, the housing 2 forms the area to accommodate a pump impeller of a water pump. A water pump housing 6 forms part of the housing 2. This water pump is driven, e.g., electrically or in a manner known per se by the crankshaft end of the combustion engine via poly-V-disks and a belt.

In the area of the connecting surface 5, a heat exchanger 7 is provided in which a heat exchange between the oil and the cooling water of the combustion engine takes place. A plurality of flow passages for oil and water is provided inside the housing 2 and, i.e., a cooling water stream is guided from the water pump to the heat exchanger 7.

Figure 7:
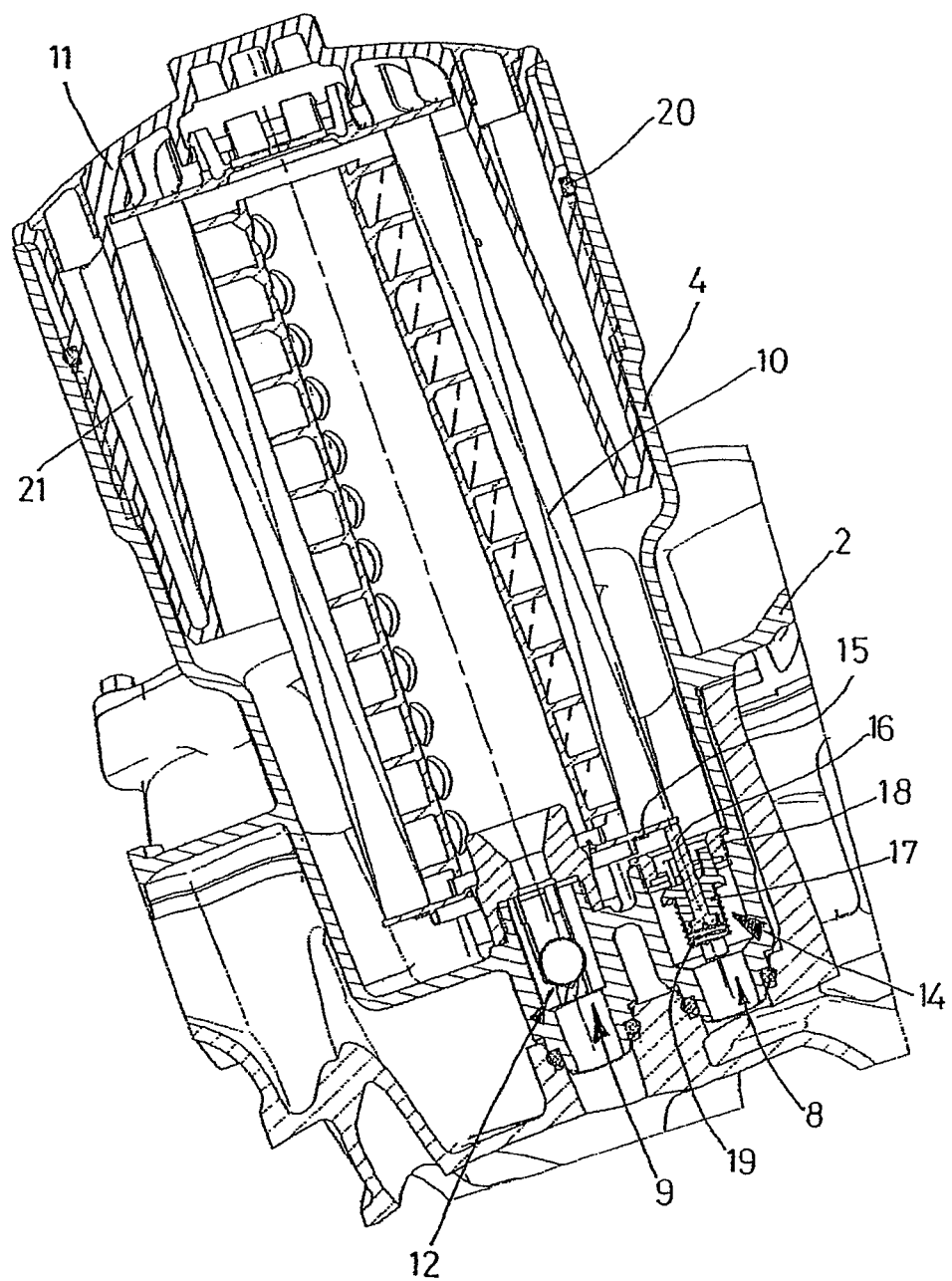
FIG. 7 shows a section through the area of the coolant treatment system.

FIG. 7 shows a section through the coolant treatment system 4. This figure shows a supply line 8 for unfiltered cooling water and a return line 9 for filtered cooling water, whereby, inside the coolant treatment system 4, the cooling water passes through a replaceable filter insert 10 that is connected to a lid 11 of the coolant treatment system 4 via a clip connection. A check valve 12 is provided in the area of the return line 9, the valve body of which check valve, embodied as a ball, makes it possible for the cleaned cooling water to flow out of the interior of the filter insert 10. However, if a higher pressure prevails in the rest of the coolant circuit than in the interior of the coolant treatment system 4, this ball closes off the return line 9 to the interior of the coolant treatment system 4.

A shut-off valve 14 is also provided in the supply line 8, which valve, however, is not pressure-operated but path-operated: the filter insert 10 presses with a lower retainer plate 15 against a tappet 16 that is moveable together with a valve body 17 of the shut-off valve 14, so that this valve body 17 must be spaced apart from the valve seat 18 assigned thereto.

If the lid 11 together with the filter insert 10 is unscrewed from the housing of the coolant treatment system 4, the indirect loading of the valve body 17 by the filter insert 10 stops and the shut-off valve 14 closes. The closing movement occurs either because the valve body 17 is pressed against the valve seat 18 by way of a spring 19, or due to the higher pressure in the rest of the coolant circuit compared to the interior of the coolant treatment system 4, if, e.g., the coolant has operating temperature and is consequently under pressure.

A comparatively long overlap area between the lid 11 and the housing of the coolant treatment system 4, and the arrangement of a seal 20 at sufficient distance from the upper edge of this housing ensure that the shut-off valve 14 is closed before the seal 20 reaches the upper edge of the cup-shaped housing of the coolant treatment system 4, so that the hot and possibly pressurized coolant is reliably prevented from escaping: firstly, the effect of the seal 20 is not cancelled until the shut-off valve 14 and optionally the check valve 12 are closed, and, secondly, a pressure drop inside the coolant treatment system 4 occurs because a displacing element 21 formed on the lid 11 restricts the fluid volume inside the coolant treatment system 4, so that when the lid 11 is removed, the fluid level inside the coolant treatment system 4 drops, since the displacing element 21 is increasingly removed from the interior of the coolant treatment system 4, namely is unscrewed together with the lid 11. The same applies to the volume of the filter insert 10 which is increasingly removed from the cup-shaped housing of the coolant treatment system 4 when the lid 11 is unscrewed, so that an excess pressure inside the coolant treatment system 4 is reliably precluded as soon as the seal 20 reaches the upper edge of the housing.

The oil filter 3 also has a cup-shaped housing. In contrast to the coolant treatment system 4, this cup-shaped housing is embodied to be shorter, so that a considerably larger portion of the overall height of the oil filter 3 is formed by a lid 22. This lid 22 contains a bypass oil filter that is embodied as a centrifuge and the rotor of which during service is replaced together with the filter insert of the oil filter 3.

Figure 6:
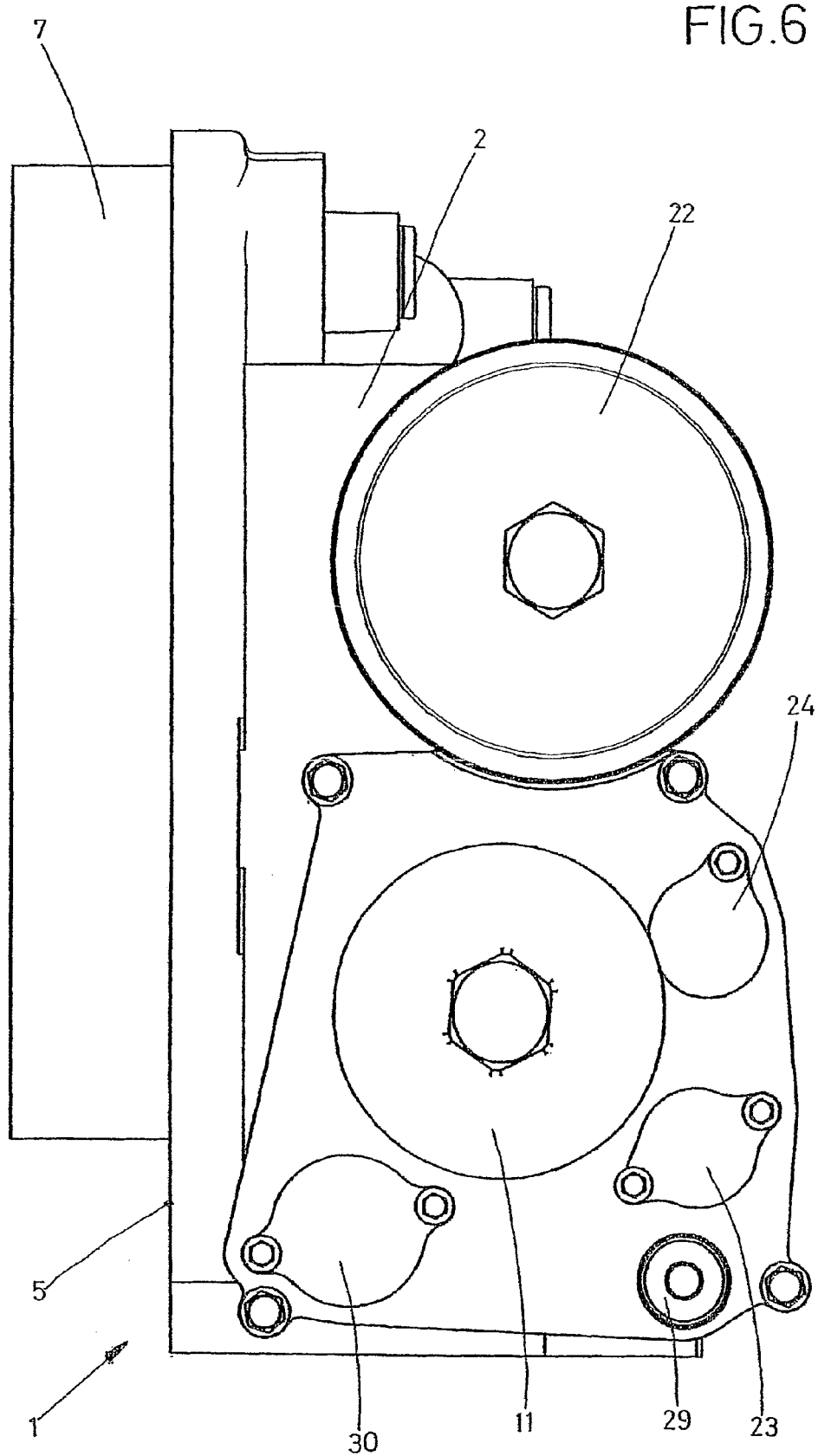

Several connections are provided on the side of the oil/coolant module 1 that is located opposite the connecting area 5, e.g., a connection 23 for the return line of a cabin heater or a connection 24, which according to FIG. 6 is provided with a fill plug and is used for connecting an oil filler nozzle. Alternatively to the exemplary embodiment shown, depending on the location and accessibility of the oil/coolant module 1, e.g., in the engine compartment of a motor vehicle or as a free-standing power/heat unit, it can be provided that the oil/coolant module 1 itself embodies an oil filler nozzle.

Figure 4:
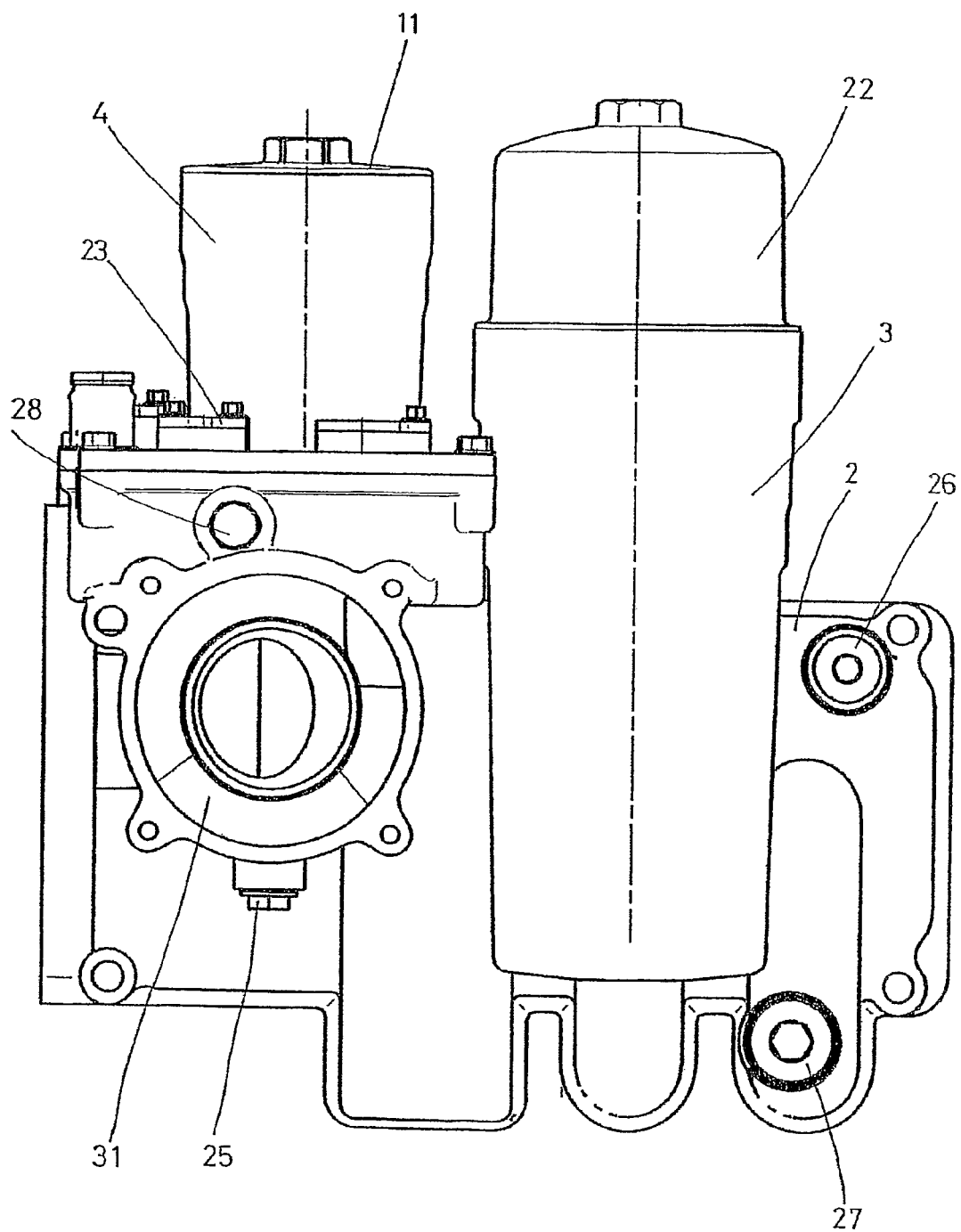

In FIG. 4 a connection 25 for the return line of a fuel preheating is shown as is a connection 26 for a coolant preheating, whereby this can occur, e.g., by way of an electric or fuel-driven additional heating device.

In FIG. 4 furthermore, a connection 27 that is provided for the initial filling of the combustion engine with oil is shown as is a connection 28 for the return line of an air compressor cooling.

Figure 5:
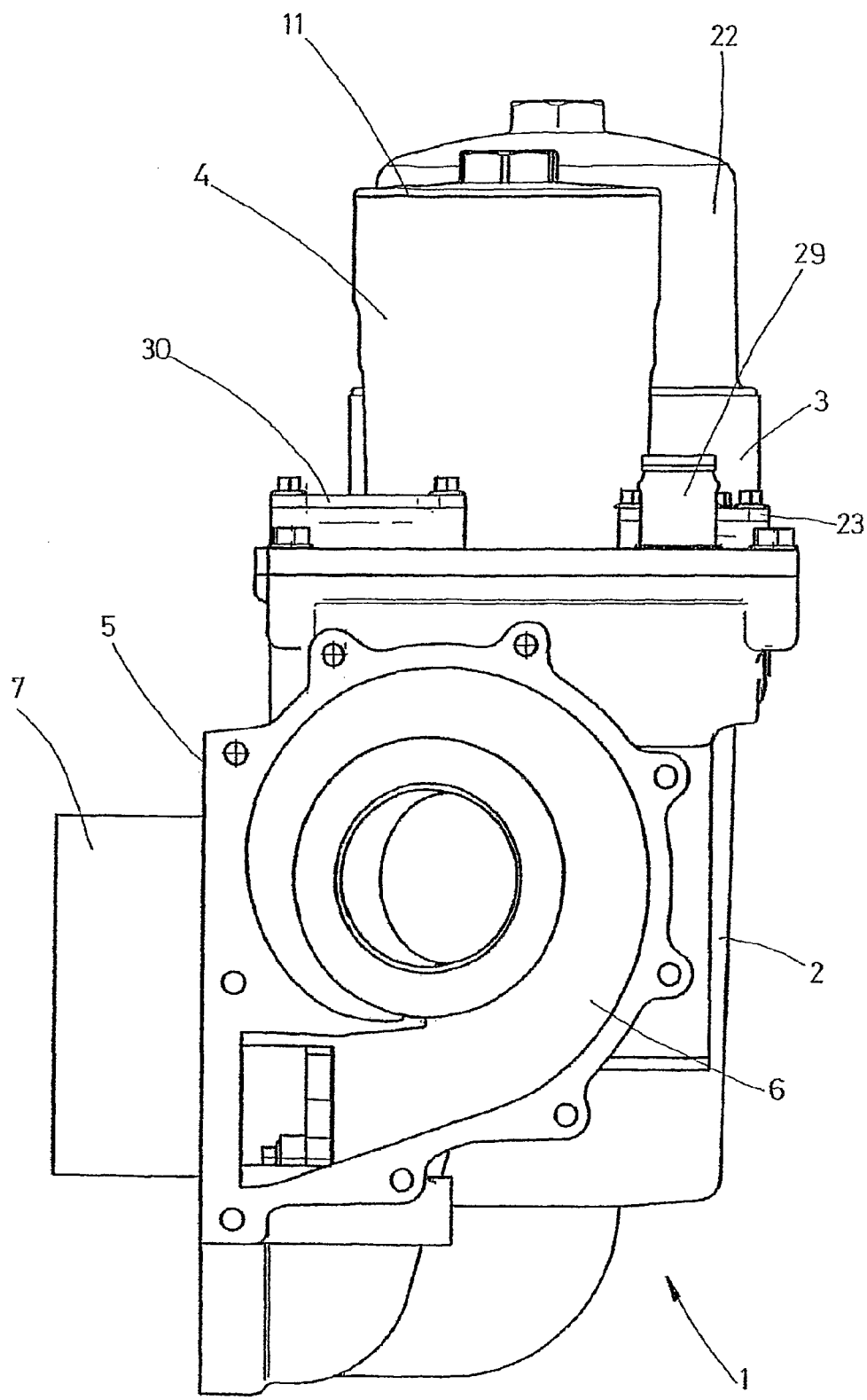

In FIG. 5 a connection 29 for the filling line of a coolant recovery tank is shown as is a connection 30 for a forward stroke of the cooling of an exhaust gas recirculation system. In FIG. 4, the housing 31 of a cooling water thermostat formed from the housing 2 is shown.

Figure 3:
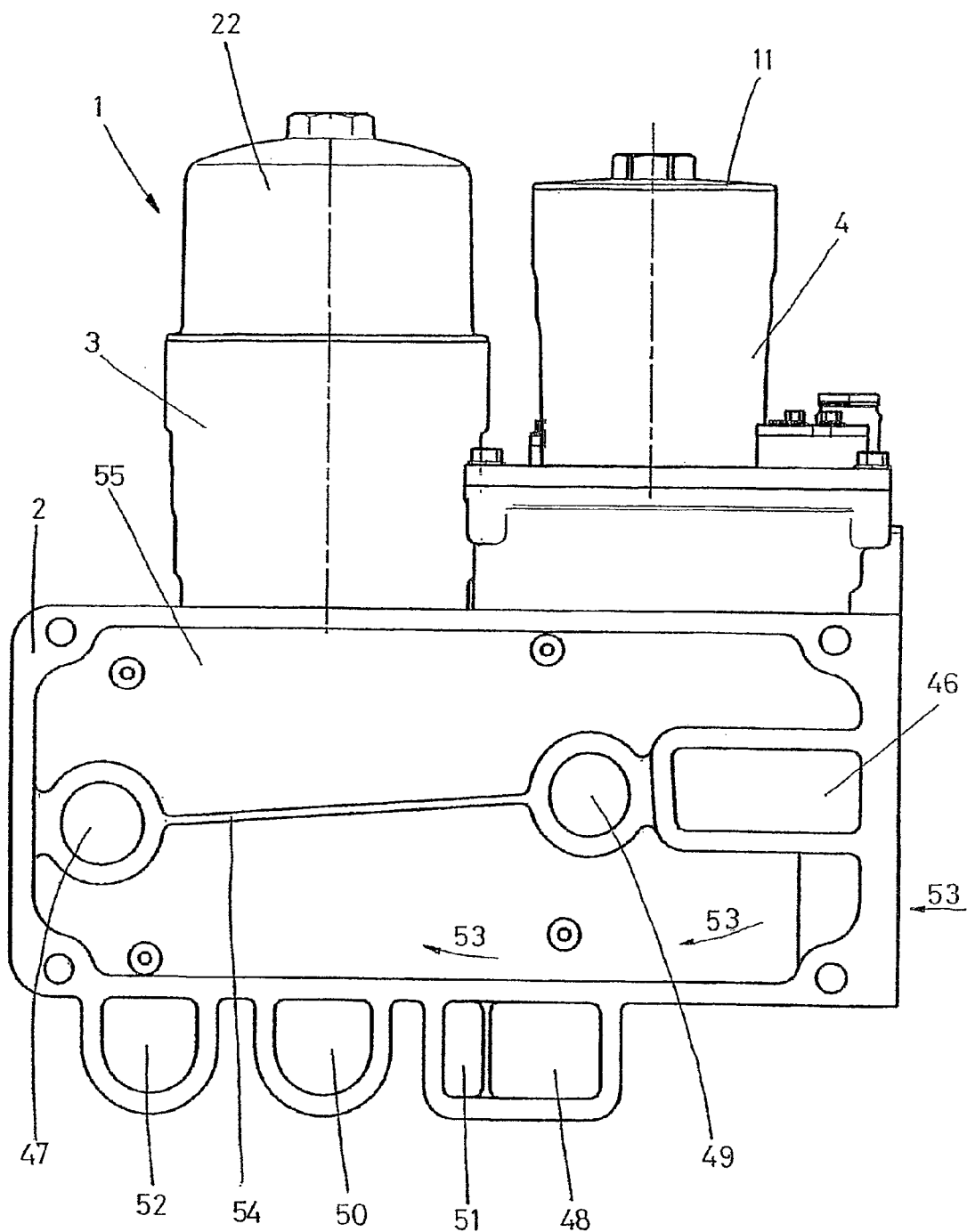

FIG. 3 shows a similar view to FIG. 1, but with the heat exchanger 7 detached. The housing 2 of the oil/coolant module 1 here has a plurality of inlet or outlet openings for oil and water: Reference 46 is an opening via which water for the small cooling circuit, i.e., the short-circuit circuit, reaches the oil/coolant module 1. An opening 47 via which hot, unfiltered oil can reach the heat exchanger 7 is shown. Reference 48 is an opening that can be termed a collector return line and via which pressureless oil can flow to the crankcase of the combustion engine. Via the opening 49, cooled oil passes from the heat exchanger 7 into the oil/coolant module 1 and to the oil filter 3, whereby the subsequently filtered clean oil passes through the opening 50 to the housing of the combustion engine and from there to the individual points of lubrication. Reference 51 is an opening via which oil can flow from a drain valve of the oil filter 3 into the crankcase of the engine.

The oil that flows via the opening 47 into the heat exchanger 7 is both uncooled and unfiltered. A partial flow of this oil can pass through the opening 52 to the bypass oil filter. Because the through-flow of the heat exchanger 7 is avoided for this partial flow, and consequently fewer pressure losses occur before the centrifuge of the bypass oil filter, more output energy can also be used in the centrifuge for the separation output so that a better efficiency of this bypass oil filter is produced.

Cooling water flows along the arrow labeled 53 into the housing 2 of the oil/coolant module 1 and is deflected before a separation wall 54 into the heat exchanger 7. It exits the heat exchanger 7 and reaches the large-area opening 55, through which it flows out of the housing 2 of the oil/coolant module 1.

Figure 8:
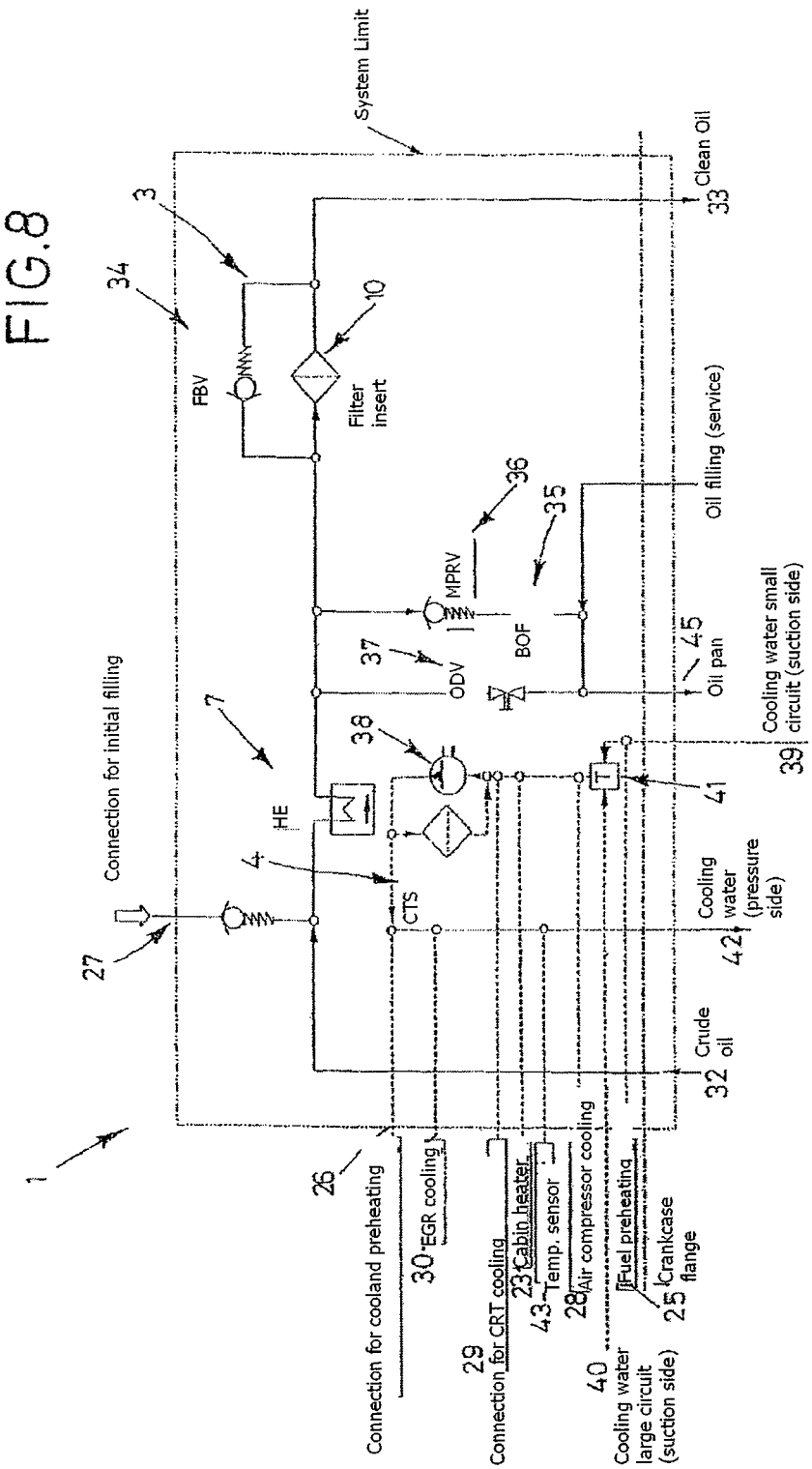
FIG. 8 shows a functional diagram of the oil/coolant module.

FIG. 8 shows the functional diagram of the oil/coolant module 1. Reference 32 is the supply line for unfiltered crude oil which arrives at the heat exchanger 7 and from there at the oil filter 3. The crude oil passes through the filter insert 10 and reaches the pure oil outlet 33. In the event of a clogged filter insert 10, the crude oil can bypass the filter insert 10 by way of a filter bypass valve 34 and reach the outlet 33. A by-flow of the unfiltered crude oil is guided through a bypass oil filter 35 if a sufficient minimum pressure is present and a minimum pressure retaining valve 36 is opened. If the pressure falls below the minimum level, the entire amount of oil is fed to the oil filter 3.

The oil filter 3 can be completely emptied via an oil drain valve 37, e.g., during a replacement of the filter insert 10, so that the filter insert 10 can be removed from the oil filter housing with as few drips as possible. Reference 45 is a lead that goes to the oil pan of the combustion engine and to which this unfiltered oil is fed. Clean oil that is to be poured into the engine can likewise reach the crankcase of the engine through this lead 45 if the oil/coolant module 1 has the corresponding feed opening for clean oil.

Apart from the passages for the oil circuit described above, the oil/coolant module 1 also guides the cooling water: a water pump 38 is shown. On its suction side the cooling water passes either via a small circuit at 39 or via a large circuit at 40 guided through a water cooler, whereby a cooling water thermostat 41 opens one of the two circuits 39 or 40 in a temperature-dependent manner and switches through to the water pump 38. On the pressure side of the water pump 31 the water is guided through the heat exchanger 7, whereby part of the cooling water quantity is recirculated through the filter of the coolant treatment system 4 and otherwise the main amount of the cooling water flows out at a cooling water outlet 42 to cool the engine, e.g., flows into the engine housing to which the oil/coolant module 1 is flange-connected.

On the edge of the oil/coolant module 1 at the left the various connections are diagrammatically indicated as well as a connection 43 for a temperature sensor. Furthermore, the oil/coolant module 1 has a connection 27 for an initial filling with motor oil at the vehicle manufacturer of the oil/coolant module 1.

The invention claimed is:

1. An oil/coolant module for a combustion engine, comprising:
   a housing adapted to be connected to an engine block;
   an oil/water heat exchanger arranged in the housing;
   an oil filter arranged on the housing;
   a water pump housing; and
   a coolant treatment system comprising a water filter,
   wherein oil passes from said heat exchanger to the oil filter,
   wherein one portion of coolant passes to the coolant treatment system and another portion flows out of an outlet to cool the combustion engine,
   wherein the oil/coolant module is a self-contained unit connectable to the combustion engine, and
   wherein said one portion of the coolant passes to the coolant treatment system after passing said heat exchanger.

2. An oil/coolant module for a combustion engine, comprising:
   a housing having a connection surface adapted to be connected to an engine block;

an oil/water heat exchanger arranged in the housing;
an oil filter arranged on the housing;
a water pump housing having an outlet in fluid communication with a space containing said heat exchanger; and
a coolant treatment system comprising a water filter,
wherein oil passes from said heat exchanger to the oil filter,
wherein the oil/coolant module is a self-contained unit connectable to the combustion engine via the connection surface, and
wherein one portion of coolant passes to the coolant treatment system and another portion flows out of an outlet to cool the combustion engine and wherein said one portion of the coolant passes to the coolant treatment system after passing said heat exchanger.

* * * * *